Patented Nov. 16, 1926.

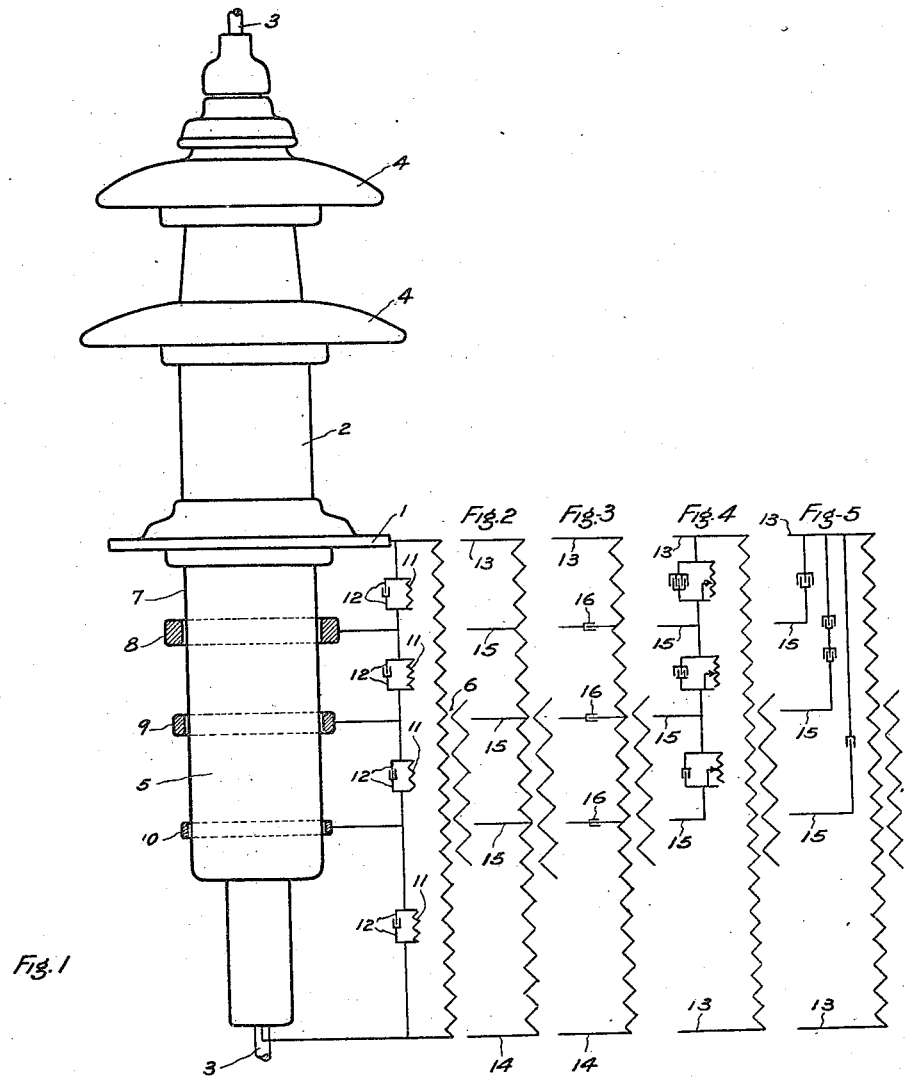

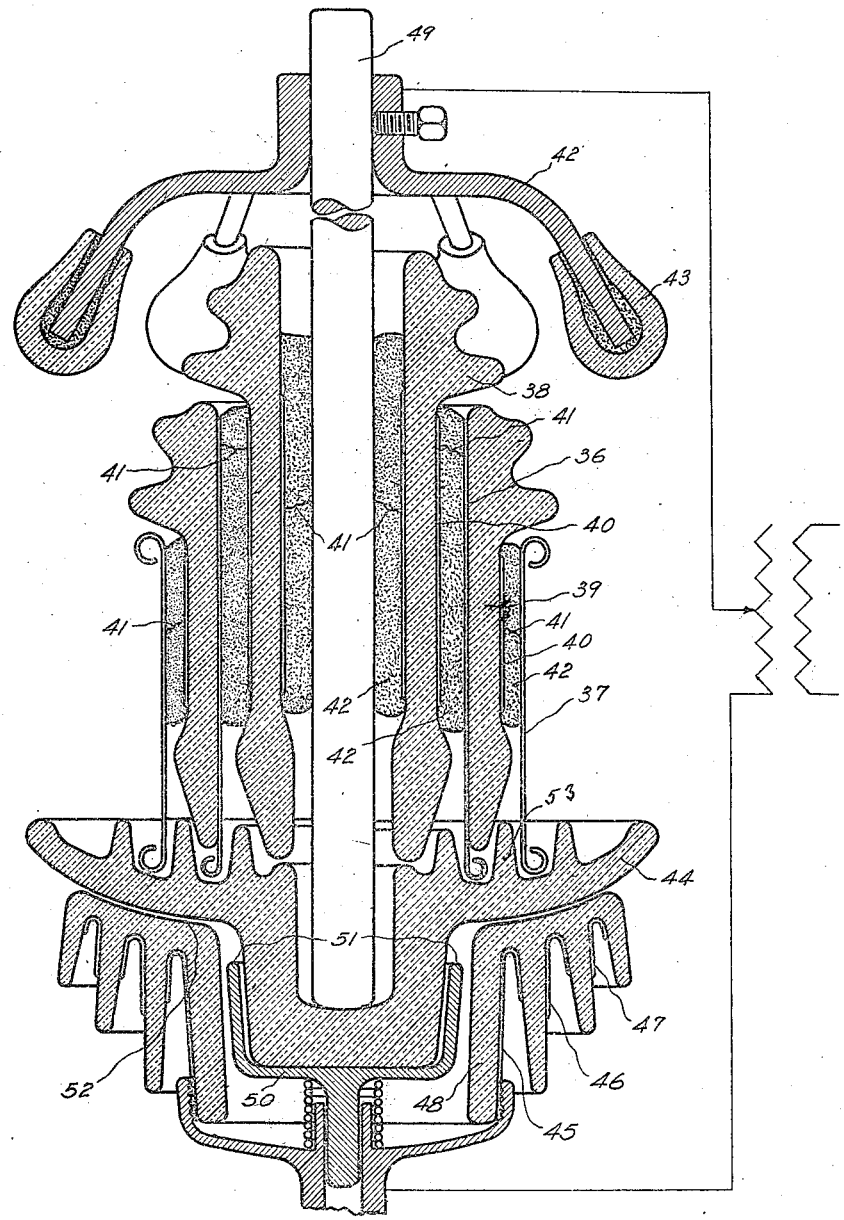

1,607,425

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

METHOD AND APPARATUS FOR TESTING INSULATORS.

Application filed March 1, 1923. Serial No. 621,967.

This invention relates to tests of the dielectric strength of insulators and insulator parts and has for its object the provision of a method in which the tendency to flash-over is reduced, thus permitting the test piece to be subjected to a high test voltage. The invention is exemplified in the steps of the process described in the following specification and illustrated in the accompanying drawings.

In the drawings—

Fig. 1 is a diagrammatic elevation showing one arrangement of apparatus for carrying out the present invention.

Figs. 2, 3, 4 and 5 are diagrams of different circuits that may be used in the process.

Fig. 7 is a view similar to Fig. 6 showing a somewhat different arrangement of apparatus.

Figure 6:
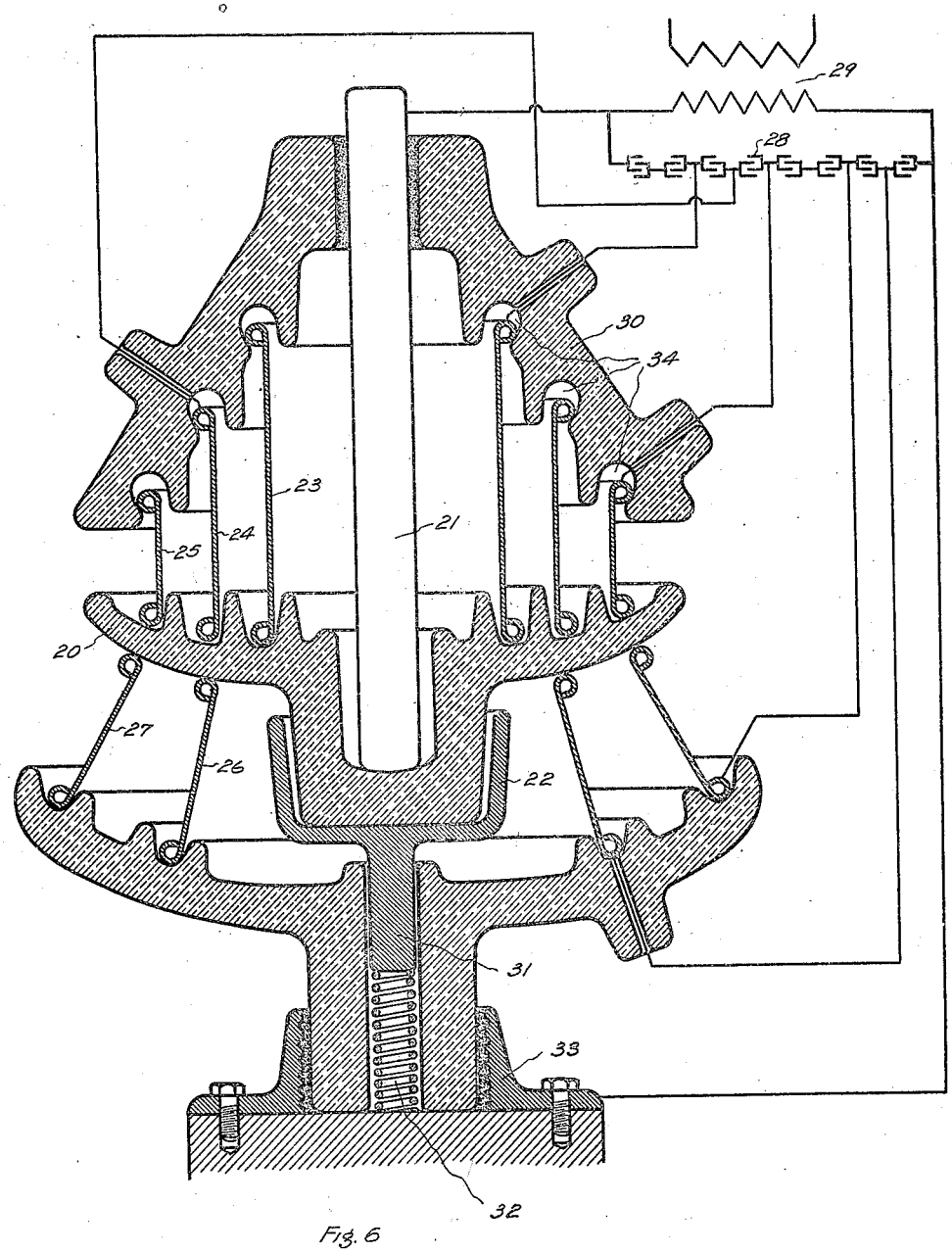
Fig. 6 is a diagrammatic sectional view showing an arrangement of apparatus for applying the test to a different form of insulator part.

In testing dielectric parts it is a well known fact that a short time test at a high voltage is more effective in weeding out faulty material than a very long time test at a much lower voltage. This is particularly true in connection with insulating parts made of porcelain where there is little or no successive breaking down due to brush discharge on the surface which may be affected by time. The method is particularly applicable to bushings or tubes which operate partially in air and partially in oil, such as transformer or switch bushings shown in Fig. 1.

When tested in air, the lower end of the bushing may flash-over at a comparatively low voltage relative to what it will when the end is immersed in oil, and it is an advantage to apply a high proving test without the necessity of placing the part either partly or wholly in oil. In testing the part in oil, there is always some question as to whether the stress has been localized to a comparatively small zone or whether a sufficient area has been under stress to insure proper reliability in all parts. If the part can be tested at a sufficiently high voltage in air, this highly localized stress will be avoided and all parts of the piece under test will be given a more thorough stress. This method is applicable to all forms of insulation including flat and tubular members as well as insulator parts and sheet insulation in its various forms.

Figure 1 shows one manner of applying the test. A metal flange 1 attached to the insulating body 2 is generally used for attaching the bushing to the cover of the transformer or oil switch, or in mounting the bushing in a roof or wall of the station. This flange is usually connected to ground while the conductor 3 running thru the bushing is insulated from the ground by the insulating members 2. The flanges 4 increase the flash-over of the bushing on the upper end. As this end of the bushing will operate in air, a test voltage may be applied to this end of the bushing which will be sufficiently high for proving out the dielectric strength for operating conditions. The portion 5 below the flange, however, has a relatively low flash-over compared to the upper end or portion above the mounting flange 1. It is evident that a voltage can be applied by test transformer 6, one end of which is connected to the flange 1 and the other to the conductor 3 running thru the bushing so that the parts of the bushing between these members can be subjected to high voltage.

When the bushing is operated in a transformer or oil switch, the end 5 is either wholly or partially immersed in oil. If, however, the bushing operates in air, this end will have a much lower flash-over than the upper end, even though the length of the bushing be increased materially. If the bushing is mounted in a wall or roof, the long end will withstand a very high surge momentarily without spilling or arcing. Under test conditions, however, the longer bushing cannot be given a much higher test than the shorter one as streamers start out from the flange 1 over the surface at 7. These streamers are small arcs and shunt the surface, thereby reducing its effective length and flash-over voltage. If the current is reduced in these streamers the shunting effect will be reduced and the flash-over of the bushing will be increased. The streamers are due to the fact that the flange 1 together with the conductor 3 and the dielectric member 7 form an electrostatic condenser.

At the high voltage the air is broken down by the electrical stress and the streamers flow along the surface on either side of the mounting flange 1. These streamers act as conductors and increase the plate area of the condenser. If a suitable ring 8 is placed around the insulating member and is approximately the same potential as the mounting flange 1, streamers will start from the ring 8 and will reduce those starting from the mounting flange 1. It is evident that if this ring were of the same potential as the flange 1, that the length and flash-over of the bushing would be reduced. If, however, this ring has a potential between that applied to the flange 1 and the conductor 3, it is possible to increase the flash-over of the bushing, for the streamers starting from the flange 1 will be reduced, and as the stress between the ring 8 and the conductor 3 will be less than between the flange 1 and the conductor 3 the streamers starting from the ring 8 will be shorter and will have less shunting effect.

By using several rings such as 9 and 10 whose voltage or potential relative to the flange 1 and conductor 3 is regulated, it is possible to greatly increase the flash-over of the piece under test. The voltage of these rings may be controlled by attaching to the proper points in an electro-static condenser having elements 12, one end of which is in electrical contact with the flange 1 and the other end in electrical contact with the conductor 3. The relative electro-static capacity between the various control rings will of course vary with the test piece and conditions desired.

If test pieces have an appreciable leakage or the frequency of the testing circuit is very low, it may be advisable to use resistance members 11 entirely, or in multiple with the sections of the condenser 12. This will prevent a piling up of stress due to leakage current which would tend to unbalance the distribution set up by the condensers 12, or where no potentiometer was used. If transformers are used in series or the transformer has suitable taps, the transformer arrangement shown in Fig. 2 may be used in place of the condensers or resistances. The end connectors 13 and 14 of the transformer are connected with flange 1 and conductor 3 respectively and the taps 15 are connected with the rings 8, 9 and 10 respectively.

Spill-overs from unbalancing which may occur momentarily due to moisture on the surface or due to small irregularities may be largely obviated by the arrangement shown in Fig. 3, where condensers 16 are used in the taps running from the transformer to prevent short circuits. Other arrangements may be used similar to that shown in Figs. 4 and 5. The general principle, however, is the same. Other combinations and arrangements may be used to produce the same results.

Fig. 6 illustrates the application of the test method to an insulating shell. Stress is applied to the insulating member 20 by the electrodes 21 and 22 which are attached to the terminals of a testing transformer 29 which may be arranged to apply any desired voltage. As the insulating member is of a different shape from that shown in Fig. 1, the control rings will of necessity have to be changed in order to produce the desired effect. Control rings or sleeves 23, 24 and 25 are used to control the stress on one side of the test piece 20, and control sleeves 26 and 27 are used to control the stress on the other side of the test piece. The relative voltage on these rings or sleeves may be produced by their relative electrostatic capacity, or by attaching directly to the proper points in a condenser 28 connected across the terminals of the transformer 29. In place of condensers in series, a transformer with proper taps may be used, or a potentiometer or a combination may be used as in the case of Fig. 1. The condensers used may be of any suitable type and shields may be used if desired to control the field and regulate the electro-static capacity of the control sleeves or rings where they are used without any connection to a condenser or transformer. The voltage may be raised very materially on some types, permitting the degree of voltage desired without the necessity of placing the test piece in oil. In addition, the control of the stress at different points is more definite, and a gradient approaching the ideal is more nearly attained than in other methods. The test is easily applied, as the following explanation will show.

The test sleeves 23, 24 and 25, together with the center electrode 21, held together by the insulating separator 30 are removed and a test piece 20 is placed in the metallic cup 22 forming an electrode for the head of the test piece. The electrode has a stem 31 resting on a spring 32 which is in electrical contact with the supporting base 33. The weight of the test piece 20 is sufficient to deflect the spring 32 so that the control sleeves 26 and 27 come into proper position with respect to the surface of the test piece. The upper test electrode 21 together with the control sleeves is then lowered into proper test position. The control sleeves 23, 24 and 25 rest in pockets 34 which permit the sleeves to come in approximate contact with the surface of the test piece and at the same time will accommodate irregularities. These test sleeves may be made in a single piece or in several parts, and of practically any conducting material. When made of wire screen they afford opportunity to observe the test at all points of the test piece. The method is particularly applicable for insulator parts which have large diameters and which may have a relatively low flash-over at normal frequency compared to the stress which may be thrown on them under the operating conditions where a surge is present produced by lightning, switching or other cause. The test may be applied to the unassembled or assembled parts and to multipart insulators as well as to individual members. Owing to the higher potential which is possible to apply, the time of the test may be short which is a considerable advantage. With a short time test, it is possible to test large quantities with minimum equipment, particularly where they are placed on revolving stems which automatically bring the test members into position.

Another modification of the test method is shown in Fig. 7. The control sleeves 36 and 37 are so proportioned together with the insulating members 38 and 39 that they set up proper conditions without the necessity of attaching to the various taps in the transformer or to different points in a potentiometer. The dielectric members 38 and 39 have metallic coats 40 which are connected electrically by leads 41 to the control sleeves and electrode respectively. The control sleeves as well as the insulating parts are shown connected together with cement zones 42, but may be connected by other means so as to permit adjustment. The insulating members 38 and 39 form the dielectric plates of the condenser and permit of a close spacing of the control sleeves so as to obtain the proper gradient. The electro-static field and the relative voltage gradient of the control sleeves 36 and 37 may be affected by adjusting the control member 42. This control member may be in any suitable form or it may be provided with insulated control 43 which latter permit of very close spacing without danger of causing flash-over.

A different method is used for the control of the stress on the opposite surface of the test piece 44. The control rings, sleeves, or zones 45, 46 and 47 are covered by an insulating material 48. This insulating material may be in a single piece or in various pieces, or it may be made up in sections depending upon the test piece. In some cases, individual cylindrical control members such as the insulated control shown at 43 may be used to advantage. The principal, however, is somewhat the same in either case.

When voltage is applied between the electrodes 49 and 50, streamers tend to start from the electrodes out over the surface of the test piece, as explained before. As the control sleeve 45 is connected electrically to the electrode 50, it will have the same potential. If proper relative dimensions are provided, the charging current at the high voltage which would normally have to be supplied by streamers starting from the edge 51 of the electrode cup over the surface of the insulator could be partly supplied by the field set up by 45. Since part of the charging current will be supplied by the sleeve 45, the current in the streamer starting over the surface from 51 will be reduced and the shunting effect thereby lessened. As the shunting effect is reduced, the flash-over of the piece will be raised permitting of a higher test voltage.

By covering the sleeves with insulation, it is possible to bring the test sleeves very close to the surface and thereby produce an effective control of the streamers. The insulated covering limits streamers tending to start on the surface at 52. By making the sleeves 45, 46 and 47 of proper relative size, it is possible to obtain a voltage control of the surface so that the flash-over will be materially raised.

The field may be further controlled by the use of an auxiliary control member such as 42 placed below in the same manner as shown above. The insulating sleeves 38 and 39 mesh with the projections 53 in the test piece. This increases the length of the discharge path and tends to increase the flashover in some cases. It is evident that control of relative voltage of the various test sleeves may be accomplished by the use of auxiliary condensers attached by leads as shown in Figs. 1 and 6.

The voltage may also be controlled by the use of combinations of resistances and condensers or by different taps on the transformer. Another method is to use a resistance connected across the terminals of the transformer and connect the control sleeves to taps at the different points to obtain the proper voltage control.

In many cases it not necessary to have the voltage grading tubes or rings in contact with the test piece, as they may be spaced from the surface. Moving the grading rings or tubes away from the surface reduces their influence, hence may constitute a means of control.

I claim:—

1. The method of testing the dielectric strength of an insulator part comprising the steps of subjecting said part to a potential difference greater than that at which a flashover would normally occur, and supplying charging current to said insulator at points spaced and electrically separated from the points of application of the test voltage to prevent flash-over.

2. The method of testing an insulator part, wherein opposite portions of said part are connected with conductor terminals and a potential difference impressed upon said terminals, greater than that which would cause flash-over of said part under conditions of service, charging current being supplied to said part during said test at points removed from said terminals to cut down the charging current flowing from said terminals and so raise the point of flashover above that of the service conditions of said part.

3. Apparatus for testing insulators comprising a terminal member for impressing test voltages on an insulator, and means for initially supplying charging current to said insulator at a distance from the place of application of said test voltage.

4. Apparatus for testing the dielectric strength of an insulator part comprising a terminal member for supplying test voltages to said part and means for supplying charging current to said part comprising alternating plates of conducting and dielectric material forming a condenser, the parts of which are spaced outwardly from said terminal member.

5. Apparatus for testing the dielectric strength of insulator parts comprising a pair of terminal members for impressing a difference of potential at opposite positions on said parts, a conductor member connected with one of said terminal members and extending adjacent said part at a distance from said terminal member for supplying charging current to said part, a dielectric covering for said conductor member, a second conductor member spaced from the other of said terminal members and forming a condenser element therewith for supplying charging current to said part and a dielectric member interposed between said second conductor member and said last mentioned terminal member.

6. Apparatus for testing an insulator comprising a plurality of electrodes spaced from one another adjacent the surface of the insulator to be tested and means for charging the said electrodes to graded potentials.

7. Apparatus for testing an insulator comprising a pair of electrodes disposed adjacent opposite portions of the insulator to be tested, means for charging said electrodes to a test voltage, supplemental electrodes disposed adjacent the surface of said insulator on the same side thereof as one of said first mentioned electrodes and means for charging said supplemental electrodes to graded potentials less than that of the test electrode on the same side of said insulator.

8. Apparatus for testing a tubular insulator comprising a test electrode disposed within said insulator, a test electrode disposed outside of said tubular insulator, a supplemental electrode disposed outside of said tubular insulator and means for charging said supplemental electrode to a potential less than the potential of the test electrode outside of said insulator.

9. Apparatus for testing a tubular insulator comprising a test electrode disposed within said insulator, a complementary test electrode disposed adjacent the outer surface of said insulator and a plurality of supplementary electrodes disposed adjacent the outer surface of said insulator and in spaced relation with said outer test electrode and with one another and means for impressing graded potentials on the electrodes disposed adjacent the outer surface of said insulator 10. Apparatus for testing an insulator having a radially extended surface comprising test electrodes, one of which is disposed adjacent a central portion of said surface, conductor members arranged in consecutive bands about said test electrode and spaced radially therefrom and means for impressing a test voltage upon said centrally disposed electrode while said conductor bands are charged to graded potentials decreasing outwardly.

11. Apparatus for testing a dielectric member having a radial flange and said apparatus comprising a test electrode disposed adjacent the central portion of one side of said flange, conductor bands surrounding said test electrode and spaced radially relative to said electrode and one another, means for impressing a test voltage on said test electrode and means for impressing decreasingly graded voltages on said conductor bands.

12. Apparatus for testing an insulator having a radially extending flange and having circular baffles on one face of said flange, said apparatus comprising a test electrode centrally disposed adjacent the surface of said flange, conductor bands surrounding said test electrode in spaced relation thereto and to one another; said bands having their edges disposed in recesses between said baffles, means for impressing a test voltage on said test electrode and means for impressing decreasingly graded voltages on said conductor bands.

13. Apparatus for testing an insulator having a flange thereon, said apparatus comprising a seat of conducting material for supporting said insulator, a conductor ring spaced outwardly from said seat in position to engage the lower surface of said flange when said insulator is supported on said seat, a test electrode, second conductor ring, means for moving said test electrode and second conductor ring into engagement with the upper face of said flange, means for charging said test electrode and seat to a test difference of potential, and means for charging said rings to lower potentials respectively than the potentials of the electrodes disposed within said rings.

14. Apparatus for testing an insulator having a radially extending flange, said apparatus comprising a dielectric support and a conductor seat disposed centrally of said support, conductor rings mounted on said support and spaced outwardly from said seat in position to engage spaced bands on the lower surface of an insulator flange when the insulator is disposed on said support, a dielectric carrier arranged above said support, a center test electrode on said carrier, conductor rings mounted on said carrier in position to engage spaced bands on the upper face of said insulator flange, means for impressing a test difference of potential on said seat and test electrode and means for impressing outwardly decreasing graded potentials on said conductor rings.

15. Apparatus for testing an insulator having a radially extending flange, said apparatus comprising a centrally disposed test electrode, a tubular dielectric member surrounding said test electrode and spaced outwardly therefrom and conductor surfaces on opposite faces of said tubular dielectric member, said conductor surfaces serving as elements of a condenser to supply charging current to said insulator when said electrode is charged to a test potential.

16. Apparatus for testing an insulator having a radially extending flange, said apparatus comprising an elongated electrode movable into position adjacent the central portion of said flange, tubular conductor members surrounding said electrode and spaced from one another and tubular dielectric members interposed between said conductor members, said conductor members serving as elements of a condenser for supplying charging current to the flange of said insulator when said electrode is charged to a test potential.

17. Apparatus for testing an insulator having a radially extending surface, said apparatus comprising a test electrode movable into position adjacent the central portion of said surface, tubular dielectric members disposed in spaced relation to one another and to said test electrode and surrounding said test electrode, connecting material for holding said test electrode and tubular dielectric members together and conducting material disposed on the surfaces of said tubular dielectric members, to cause said surfaces to act as elements of a condenser for the purpose of supplying charging current to said insulator when said electrode is charged to a test potential.

18. Apparatus for testing an insulator having a radially extended face, said apparatus comprising a test electrode movable into position adjacent a central portion of said face, tubular dielectric members surrounding said electrode and spaced radially from one another and from said electrode, conducting material disposed on the surface of said dielectric members, serving as elements of a condenser to supply charging current to said insulator when said electrode is charged to test potential, cement for holding said electrode and di-electric members together, means for electrically connecting the conductor surfaces at opposite sides of each layer of cement and a second electrode for engaging a face of said insulator opposite said first mentioned face.

19. Apparatus for testing an insulator comprising a seat of conducting material, a dielectric member disposed outwardly from said seat and having circumferential pockets therein and conducting material disposed in said pockets, to act as elements of a condenser to supply charging current to said insulator at points spaced outwardly from said seat.

20. Apparatus for testing an insulator having a radial flange thereon, said apparatus comprising a seat of conducting material, a member of dielectric material surrounding said seat and having pockets therein, conducting material disposed within said pockets, serving as elements of a condenser to supply charging current of said flange when said seat is charged to a test potential, an electrode arranged to engage the surface of said insulator at a point opposite said seat and tubular dielectric members surrounding said electrode and having conductor surfaces on the opposite faces of each of said tubular dielectric members.

In testimony whereof I have signed my name to this specification on this 24th day of February A. D. 1923.

ARTHUR O. AUSTIN.